INVENTOR
JOHN R. SCHEEL

INVENTOR.
JOHN R. SCHEEL

United States Patent Office 3,481,265
Patented Dec. 2, 1969

3,481,265
FUMES RECEIVER WITH AUTOMATIC DAMPER
John R. Scheel, Anderson, Ind., assignor to Hawley Manufacturing Corporation, Indianapolis, Ind., a corporation of Indiana
Filed Jan. 15, 1968, Ser. No. 697,992
Int. Cl. F23j 11/00; F16l 29/00
U.S. Cl. 98—115       9 Claims

ABSTRACT OF THE DISCLOSURE

An automatic damper assembly adapted to be inserted between a fluid-flow conduit and a separable canopy, hood, nozzle or the like and effective, when separated from the latter, to inhibit fluid flow through said conduit. In its illustrated form, said assembly comprises an open-ended tube defining a passage, said tube being adapted to be secured at one end to such a conduit, having a telescopic fit at its other end with such a canopy, hood or nozzle, having a valve disposed in said passage, moveable therein between passage-opening and passage-restricting positions and biased toward the latter, an actuator for said valve disposed outside said tube, and a guided slide disposed outside said tube for engagement with and movement by such canopy, hood or nozzle as such telescopic association is effected and operatively connected to said valve to shift the same to passage-opening position as such association is effected.

---

The present invention relates to an automatic damper assembly and the primary object of the invention is to provide means insertable between a fluid-flow conduit and a canopy, hood, nozzle or the like and effective to open the nozzle to the conduit whenever the nozzle is assembled on the conduit but automatically to restrict flow through the conduit whenever the canopy, hood, nozzle or the like is disassembled from the conduit. While the invention is of broad utility in such environments and regardless of the direction of fluid flow, it has been designed primarily for use in the fumes control system disclosed in the patent to Hawley No. 2,923,227 issued Feb. 2, 1960; and it has been illustrated in the accompanying drawings, and will be herein described, in use in that environment.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
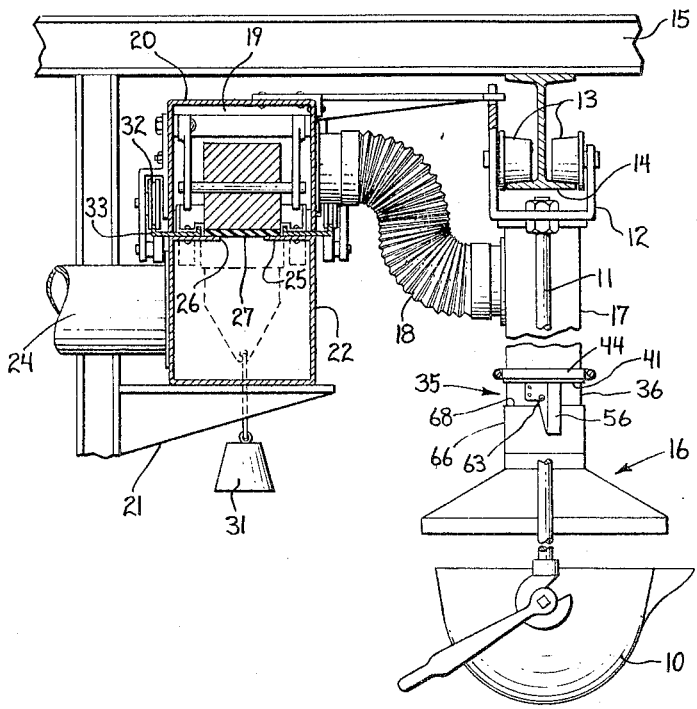
FIG. 1 is substantially identical with FIG. 1 of the said prior Patent No. 2,923,227, except that it shows the damper assembly of the present invention interposed between the fluid-flow conduit and the canopy of the said prior patent.

Referring more particularly to FIG. 1, it will be seen that I have shown a conventional pouring ladle 10 supported by frame elements 11 depending from a carriage 12 provided with wheels 13 which are guided to run upon a trackway 14 suitably mounted upon transverse elements 15 which may be the structural girders of the building in which the system is housed. In such a system, it is desirable to provide a hood or canopy 16 over the ladle to receive fumes emanating therefrom and to provide means for conducting those fumes to a point of discharge so arranged as to dissipate those fumes harmlessly.

As shown, the canopy 16 may be suitably supported from the frame 11 and is connected through a conduit 17 fixed to the carriage 12, and preferably through a flexible conduit means 18, to the chamber 19 formed in a carriage 20. Suitable supports 21 carry a stationary header 22 which parallels the course of the trackway 14. The header 22 is completely closed, except for one or more outlet conduits 24 leading to one or more exhaust fans, and except for the fact that its top wall 25 is formed with a slot 26 extending substantially from end to end of the header.

A web or strip 27, which may be formed of any flexible material substantially impervious to fluid flow therethrough, is arranged to span the slot 26 and to overlap the lateral edges thereof on the outer surface of the wall 25. One end of said web is suitably anchored beyond the adjacent end of the slot 26, while the other end of said web extends beyond the opposite end of said slot, so that the web, when in contact with the wall 25, is capable of sealing the slot 26 completely. Preferably, a resilient, longitudinal tension is applied to said web to assist in maintaining proper sealing engagement between the web and the wall 25; and in the illustrated embodiment, a weight 31 is attached to the free end of said web to apply such longitudinal tension thereto.

The carriage 20 is supported by wheels 32 arranged to run upon track elements 33. Roller means within said carriage are arranged to lift a section of the web 27 within the chamber 19 away from the wall 25 to provide continuous open communication between said chamber 19 and the interior of the header 22, as the carriage 20 moves along the length of said header. The structure thus far described may be identical with that disclosed in the said prior Patent 2,923,227.

It will be obvious that, when it becomes desirable to disconnect the canopy 16 from the conduit 17 in the assembly disclosed in the said prior patent, large quantities of air will be wastefully inspired through said conduit. According to the present invention, an automatic damper assembly indicated generally by the reference numeral 35 is interposed between said canopy 16 and said conduit 17. In the illustrative embodiment of the present invention, said assembly comprises a tube 36 open at its proximal end 37 and at its distal end 38 and defining a passage 39 therethrough. At its proximal end, the tube is provided with axially spaced flange means 40 and 41 which may or may not be peripherally continuous, defining therebetween a channel 42. Similar flange means 43 is formed at the distal end of the conduit 17; and a split ring 44, formed to provide axially spaced fingers or flange means 45 and 46 is arranged to span the flange means 43 and 40 to secure the tube 36 to the conduit 17, the two halves of the ring 44 being joined in any suitable manner as, for instance, by screws 47.

Figure 2:
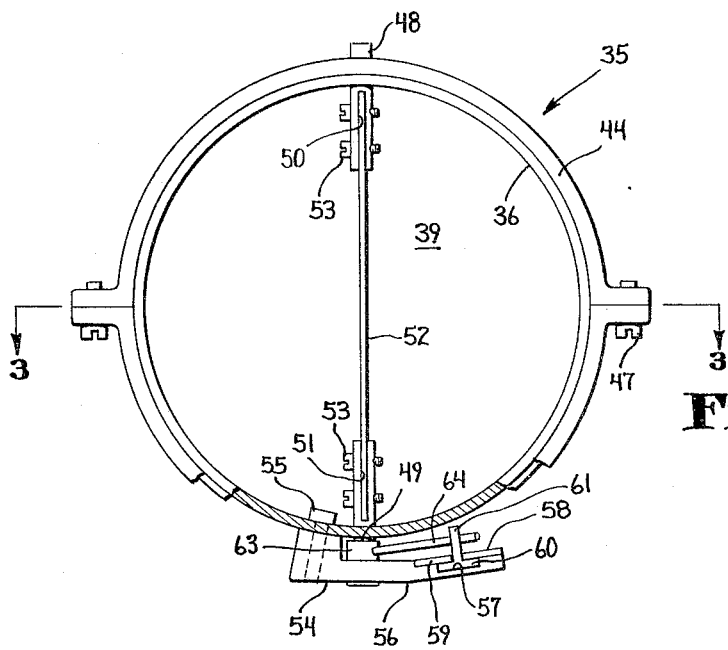
FIG. 2 is an enlarged plan view of the damper assembly of the present invention.

Within the tube 36, and preferably adjacent its proximal end 37, diametrically arranged trunnion means 48 and 49 are journaled in the tube wall. Within the passage 39, said trunnion means provide aligned slots 50 and 51 respectively receiving diametrically opposite edge portions of a butterfly valve 52, said valve being secured in said slots by any suitable means such as, for instance, the screws 53. Quite obviously, when said valve is in the position of FIGS. 2 and 3, the passage 39 provides open communication between the canopy 16 and the conduit 17; but when said valve 52 is turned about the axis of the trunnion means to a position 90° from that illustrated, said valve will close, or at least restrict, fluid flow through the passage 39.

A plate 54 is secured to the outside of the tube 36 by suitable fastening means such as the screws 55; and said plate is formed to provide a wing 56 which is spaced outwardly from said tube and extends peripherally of said tube beyond the axis of the trunnion means. Near its lateral edge, said wing is formed with a groove or guide 57 which is elongated in the direction substantially parallel with the axis of the tube 36, the plate 54 being so proportioned and arranged that the open, upper end of the groove 57 is substantially at the lower edge of the flange 41, while the lower, closed end 62 of said groove is disposed between the trunnion axis and the distal end 38 of the tube. In the illustrated embodiment of the invention, plates 58 and 59 are secured to the inner surface of the wing 56, paralleling and overlapping the groove 57 to restrict the open mouth of said groove. A slide 60 is freely reciprocably received in the groove or guide 57 and is provided with a flange 61 which extends between the adjacent edges of the plates 58 and 59 substantially radially inwardly toward the tube 36.

Outside the wall of said tube 36, the trunnion element 49 fixedly supports a collar 63 which, in the illustrated embodiment, penetrates and is journaled in the wing 56. A finger or lever 64 is fixed to said collar between the tube wall and the wing 56 and extends substantially radially away from said collar, the distal end of said lever penetrating a perforation 65 in the flange 61 of the slide 60, thus providing an operative connection between said slide and the valve 52.

It will be apparent that the slide 60 thus biases the valve 52 toward one of its extreme positions. When the assembly 35 is in the attitude illustrated in FIGS. 1 and 3, that bias tends to move the valve 52 toward its passage-restricting position; but if the assembly 35 is inverted, of course the slide will bias the valve toward its passage-opening position.

Preferably, and as illustrated, the neck 66 of the canopy 16, which is proportioned and designed telescopically to receive the distal end portion of the assembly 35, is interiorly formed with an axially-outwardly-facing shoulder 67 upon which said distal tube end will be supported when the assembly 35 is fully seated in the canopy neck.

Figure 3:
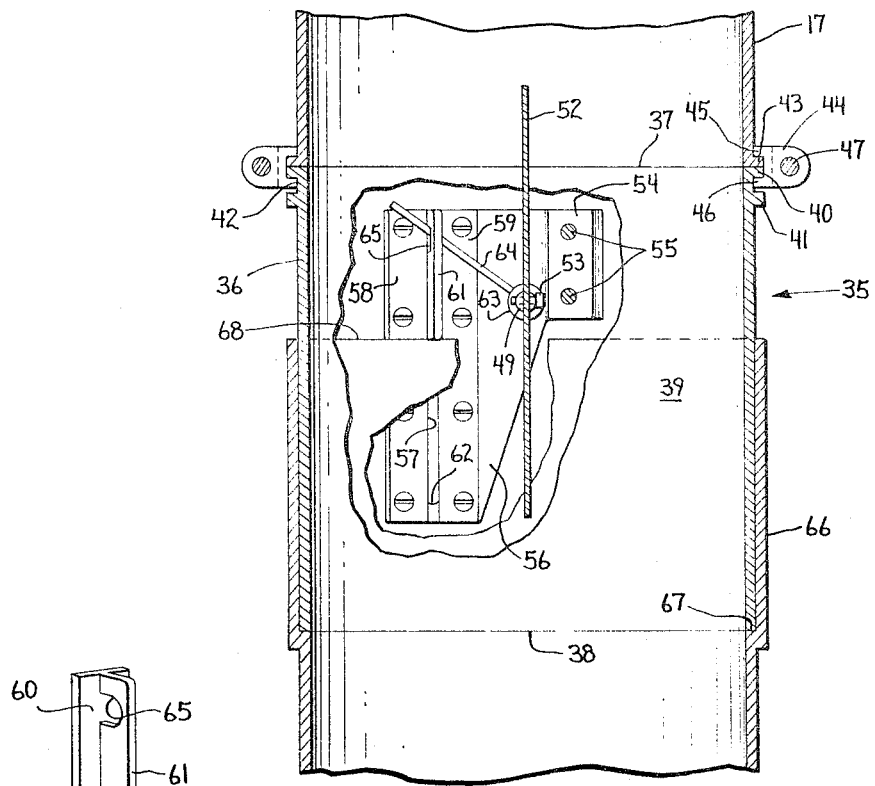
FIG. 3 is a vertical section, taken substantially on the line 3—3 of FIG. 2 and looking in the direction of the arrows, parts being broken away for clarity of illustration.
Figure 4:
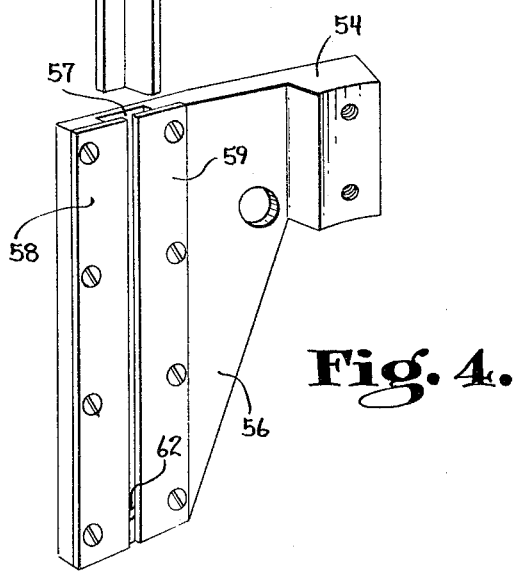
FIG. 4 is a further enlarged, and exploded, perspective view of the guide means and slide of the present invention.

As is most clearly apparent from FIG. 3, the parts are so proportioned and designed that, when said distal end 38 of the tube 36 is seated on the shoulder 67, the upper edge 68 of the canopy neck will bear upon the lower end of the slide flange 61 to hold said slide at the upper end of its guideway. At this point, the upper end of the slide flange 61 is at the level of the lower surface of the tube flange 41, the valve 52 is in its fully-open position, and further clockwise movement of said valve is prevented by engagement of the slide flange 61 with the tube flange 41. When, however, the canopy 16 is withdrawn downwardly relative to the carriage 12, gravity will cause the slide 60 to follow the upper end 68 of the neck 66, thereby turning the valve 52 in a counter-clockwise direction until the lower end of the slide 60 encounters the closed end 62 of the guideway, at which point the valve 52 will be disposed in a plane perpendicular to the axis of the tube 36 to restrict air flow through the assembly 35, and thus through the conduit 17.

When, again, the same or a different canopy, hood, nozzle or the like, having a similar neck 66, is assembled with the damper assembly 35, the upper end 68 of the neck will engage the lower end of the slide flange 61 to lift said slide, thus returning the valve 52 to its illustrated position.

I claim as my invention:

1. An automatic damper assembly comprising a tube having a passage therethrough, a valve member received in said tube and movable therein between passage-opening and passage-restricting positions, actuator means operatively connected to said valve member and having a portion disposed outside said tube, means carried by, and disposed outside, said tube and providing a guide extending substantially parallel to the axis of said tube, and a slide freely reciprocable in said guide, operatively engaging said portion of said actuator means and biasing said valve member, when said tube axis is substantially vertical, toward one of said positions.

2. The damper assembly of claim 1 in which said valve member is a butterfly valve mounted on trunnion means disposed diametrically of said passage, said actuator means includes a lever extending radially from an exteriorly protruding portion of said trunnion means, and said slide is formed with a perforation penetrated by a distal portion of said lever.

3. For interposition in conduit means comprising a proximal portion and a distal portion separable from said proximal portion, an automatic damper assembly comprising an open-ended tube, means at one end of said tube for connecting the same to the proximal portion of such a conduit means, the other end region of said tube being proportioned and arranged for telescopic reception in the distal portion of such a conduit means, a valve member received in said tube and movable therein between passage-opening and passage-restricting positions, actuator means operatively connected to said valve member and having a portion disposed outside said tube between the ends of said tube, means carried by, and disposed outside, said tube and defining a guide generally parallel with the axis of said tube and spaced radially outwardly from said tube, and a slide reciprocable in said guide, operatively engaging said actuator portion and disposed for engagement with and movement by the distal portion of such a conduit means to shift said valve member to passage-opening position when said other end of said tube is telescopically entered in such a distal portion.

4. The invention of claim 3 in which said valve member is a butterfly valve mounted on trunnion means disposed diametrically of said passage, said actuator means includes a lever extending radially from an exteriorly-protruding portion of said trunnion means, said guide extends from a point nearer to said one end of said tube than is the axis of said trunnion means to a point nearer to said other end of said tube than is the axis of said trunnion means, and said slide includes a flange extending generally radially toward said tube and formed with a perforation penetrated by the distal end of said lever.

5. In a fumes control system, a fumes receiver having a tubular neck, a conduit adapted to be connected to a vacuum source, and an automatic damper assembly comprising an open-ended tube, means for connecting said tube to said conduit, the distal end of said tube being telescopically receivable in said receiver neck, a valve member disposed in said tube and movable into and out of flow-restricting position therein, said valve being biased toward such position, and actuator means operatively connected to said valve and engageable by said neck, as the distal end of said tube enters said neck, to remove said valve out of such position.

6. The system of claim 5 in which said actuator means comprises means carried by, and spaced radially outwardly from, said tube and formed to provide a guide generally parallel with the axis of said tube, an element operatively connected to said valve and disposed between said tube and said guide-providing means, and a slide reciprocable in said guide and having a portion extending radially toward said tube to engage said neck and operatively engaging said element.

7. The system of claim 5 in which said valve member is a butterfly valve supported from trunnion means diametrically arranged relative to said tube, and said actuator means comprises means carried by, and spaced radially outwardly from, said tube and formed to provide a guide generally parallel with the axis of said tube and extending from a point nearer to the proximal end of said tube than is the axis of said trunnion means to a point nearer to the distal end of said tube than is said trunnion means, said element is a lever extending radially from said trunnion means and disposed between said tube and said guide-providing means, and a slide reciprocable in said guide and having a portion extending radially toward said tube to engage said neck, said slide portion being perforated and the distal end of said lever penetrating said perforation.

8. The system of claim 7 in which said neck is formed to define an axially-outwardly-facing shoulder to support said distal end of said tube, said slide, lever and valve being so proportioned and designed that, when said tube end rests on said shoulder, said valve is held in fully-open position.

9. The system of claim 7 in which said means for connecting said tube to said conduit comprises a radially-outward flange near the proximal end of said tube, said guide being open at its end near the proximal end of said tube and closed at its end near the distal end of said tube, a portion of said flange overlying the open end of said guide to limit valve-opening movement of said slide.

References Cited

UNITED STATES PATENTS

| | | |
|---|---|---|
| 928,158 | 7/1909 | Smethurst. |
| 1,517,224 | 11/1924 | Walsh _____ 251—149.2 |
| 1,534,845 | 4/1925 | Fowler. |
| 1,993,069 | 3/1935 | McConnell. |

MEYER PERLIN, Primary Examiner

U.S. Cl. X.R.

251—149.2

PO-1050
(5/69)

UNITED STATES PATENT OFFICE
CERTIFICATE OF CORRECTION

Patent No. 3,481,265     Dated December 2, 1969

Inventor(s) John R. Scheel

It is certified that error appears in the above-identified patent and that said Letters Patent are hereby corrected as shown below:

Claim 7, line 1, for "The system of claim 5", read --The system of claim 6--.

Signed and sealed this 25th day of January 1972.

(SEAL)
Attest:

EDWARD M. FLETCHER, JR.
Attesting Officer

ROBERT GOTTSCHALK
Commissioner of Patents